United States Patent
Anderson et al.

(10) Patent No.: US 11,850,662 B1
(45) Date of Patent: Dec. 26, 2023

(54) HIGH STRENGTH PART HAVING POWDER METAL INTERNAL RING

(71) Applicants: Gary L. Anderson, St. Marys, PA (US); Peter Stauffer, St. Marys, PA (US)

(72) Inventors: Gary L. Anderson, St. Marys, PA (US); Peter Stauffer, St. Marys, PA (US)

(73) Assignee: Keystone Powdered Metal Company, St. Marys, PA (US)

( * ) Notice: Subject to any disclaimer, the term of this patent is extended or adjusted under 35 U.S.C. 154(b) by 0 days.

(21) Appl. No.: 17/004,756

(22) Filed: Aug. 27, 2020

Related U.S. Application Data

(62) Division of application No. 14/974,498, filed on Dec. 18, 2015, now abandoned.

(Continued)

(51) Int. Cl.
*B22F 3/16* (2006.01)
*C22C 38/08* (2006.01)
(Continued)

(52) U.S. Cl.
CPC .............. *B22F 3/16* (2013.01); *B22F 1/0003* (2013.01); *B22F 3/17* (2013.01); *B22F 5/08* (2013.01);
(Continued)

(58) Field of Classification Search
CPC ...... B22F 3/16; B22F 3/17; B22F 5/08; B22F 2301/10; B22F 2301/15; B22F 2301/20;
(Continued)

(56) References Cited

U.S. PATENT DOCUMENTS 3,837,845 A 9/1974 Church
4,216,015 A 8/1980 Hickl
(Continued)

OTHER PUBLICATIONS

Merriam-Webster Online—https://merriam-webster.com/dictionary/wrought, captured Apr. 26, 2020 (3 pages) (Year 2020).
(Continued)

*Primary Examiner* — John A Hevey
(74) *Attorney, Agent, or Firm* — Alvin T. Rockhill

(57) ABSTRACT

By utilizing the technique of this invention, parts such as gears, bearing races, and one-way clutches, which could previously only be made via labor intensive machining procedures can be made utilizing power metal technology. The subject invention provides a method of manufacturing a high strength part which comprised (1) providing an external component having an external profile and an internal profile, wherein the external component is comprised of a forged powder metal or a wrought metal; (2) compacting a powder metal composition within the internal profile of the external component to produce a green internal component having a desired internal profile; and (3) sintering the green internal component within the confines of the external component to produce high strength part, and wherein the internal component is comprised of a powder metal which expands to a greater degree than does the forged power metal or the wrought metal during sintering.

16 Claims, 2 Drawing Sheets

Related U.S. Application Data

(60) Provisional application No. 62/113,808, filed on Feb. 9, 2015.

(51) Int. Cl.
    *B22F 3/17*     (2006.01)
    *B22F 1/00*     (2022.01)
    *C22C 38/16*     (2006.01)
    *C22C 38/12*     (2006.01)
    *B22F 5/08*     (2006.01)
    *F16H 55/17*     (2006.01)

(52) U.S. Cl.
    CPC .............. *C22C 38/08* (2013.01); *C22C 38/12* (2013.01); *C22C 38/16* (2013.01); *F16H 55/17* (2013.01); *B22F 2301/10* (2013.01); *B22F 2301/15* (2013.01); *B22F 2301/20* (2013.01); *B22F 2301/35* (2013.01); *B22F 2302/40* (2013.01); *F16H 2055/176* (2013.01)

(58) Field of Classification Search
    CPC .. B22F 2301/35; B22F 2302/40; C22C 38/08; C22C 38/12; C22C 38/16; F16H 55/17; F16H 2055/176
See application file for complete search history.

(56) References Cited

U.S. PATENT DOCUMENTS

| | | | |
|---|---|---|---|
| 4,363,662 A | 12/1982 | Takahashi | |
| 4,606,768 A | 8/1986 | Svilar | |
| 4,803,409 A | 2/1989 | Horikawa | |
| 6,120,727 A * | 9/2000 | Asaka | B22F 7/062 419/6 |
| 7,854,995 B1 * | 12/2010 | Anderson | B21K 1/305 428/546 |
| 2011/0283832 A1 | 11/2011 | Lindsley | |
| 2012/0297911 A1 * | 11/2012 | Geiman | B21K 1/30 74/434 |

OTHER PUBLICATIONS

Eishennawy et al., Manufacturing Processes & Materials—Fifth Edition, 2015, Society of Manufacturing Engineers, pp. 227-256 (32 pages) (Year: 2015).

L&L Special Furnace Co. Inc. What is Powder Metal Manufacturing?, Feb. 14, 2019 (https://llfurnace.com/blog/powder-metal-manufacturing/), 13 pages. (Year 2019).

* cited by examiner

HIGH STRENGTH PART HAVING POWDER METAL INTERNAL RING

This is a divisional of U.S. patent application Ser. No. 14/974,498, filed on Dec. 18, 2015, which claims the benefit of U.S. Provisional Patent Application Ser. No. 62/113,808, filed on Feb. 9, 2015. The teachings of U.S. patent application Ser. No. 14/974,498 and U.S. Provisional Patent Application Ser. No. 62/113,808 are incorporated by reference herein in their entirety.

BACKGROUND OF THE INVENTION

Powder metal parts are made by first compacting a metal powder composition into a desired shape in a die to produce a green metal part. The green metal part is then sintered at an elevated temperature to produce the powder metal part. Powder metal parts offer the advantage of being able to be formed into parts having intricate designs that frequently cannot be made by casting, forging or machining. In high volume applications, powder metal parts can typically be made at a reduced cost as compared to parts of similar design wherein machining is required. Accordingly, for economic and practical reasons, powdered metal parts are commonly used in a wide variety of applications.

Copper is frequently added to the metal powder utilized in making powder metal parts to promote rapid hardening during the cooling step as the powdered metal part is cooled after being sintered. However, the presence of copper in the metal composition causes the part to expand during sintering and leads to a significant variation in the tolerance of parts produced. In other words, the presence of copper makes it difficult to control the size and uniformity of such powder metal parts. This problem becomes more pronounced in the case of larger parts. For instance, it is typical for powder metal parts containing copper to expand from 0.001 to 0.005 inches per inch of part diameter.

U.S. Pat. No. 3,837,845 discloses a steel powder particularly adapted for use in powder forging and having a composition consisting of about 0.05-0.15% carbon, about 0.2% silicon, up to less than 1% manganese, about 0.5-4% nickel, about 0.2-2% molybdenum, up to about 0.2% columbium, up to 2% copper, about 0.01-0.25% oxygen, with the balance of the composition being essentially iron. U.S. Pat. No. 4,363,662 discloses another copper containing powder metal composition which is used to provide improved abrasion resistant. This composition includes 1.1-1.6% carbon, 1.5-3.5% chromium, 1.6-2.9% molybdenum, 1.0-3.0% nickel, 3.0-5.0% cobalt, 0.5-1.5% tungsten, and 1.8-18.0% copper with the balance of the composition being iron. U.S. Pat. No. 4,803,409 discloses an copper containing alloy steel powder for powder metal applications which includes 0.2-2.0% tungsten, 0.8-3.0% nickel, and 0.2-2.0% copper with the balance of the composition being essentially iron.

There is a continuing demand for a wide variety of powder metal parts which are stronger, more durable, and can be meet more and more stringent performance requirements. For instance, there is a need for powder metal toroids of all types, such as gears, bearing races, and one-way clutches which are stronger and more durable to provide a prolonged service life without failure and without compromising part tolerances and uniformity.

SUMMARY OF THE INVENTION

The present invention relates to a low cost technique for manufacturing parts of a generally toroidal shape, such as gears, bearing races, and one-way clutches, utilizing relatively low cost powder metal technology. The parts made employing this technology are strong, durable, and are capable of meeting stringent performance requirements without compromising tolerances or uniformity. By utilizing the technique of this invention parts can be made utilizing power metal technology which could previously only be made via labor intensive machining procedures.

The subject invention more specifically relates to a method of manufacturing a high strength part which comprised (1) providing an external component having an external profile and an internal profile, wherein the external component is comprised of a forged powder metal or a wrought metal; (2) compacting a powder metal composition within the internal profile of the external component to produce a green internal component having a desired internal profile; and (3) sintering the green internal component within the confines of the external component to produce high strength part, and wherein the internal component is comprised of a powder metal which expands to a greater degree than does the forged power metal or the wrought metal during sintering.

The high strength metal parts made by utilizing the technique of this invention are comprised of an external component and an internal component, wherein the external component has an external profile and wherein the internal component has an internal profile, wherein the external component is comprised of a forged powder metal or a wrought metal and wherein the internal component is comprised of a powder metal which expands to a greater degree than does the forged powder metal or the wrought metal during sintering. In other words the toroidal parts which are manufactured in accordance with this invention have an outer layer which is comprised of a forged powder metal or a wrought metal and an inner layer which is comprised of a sintered powder metal. These parts exhibit superior strength and durability as compared to parts made using conventional technology. On sintering the inner layer of the toroid part becomes extremely strong and hard due to compressive forces and metal bonding between the internal component and the external component of the toroid develop.

Figure 2:
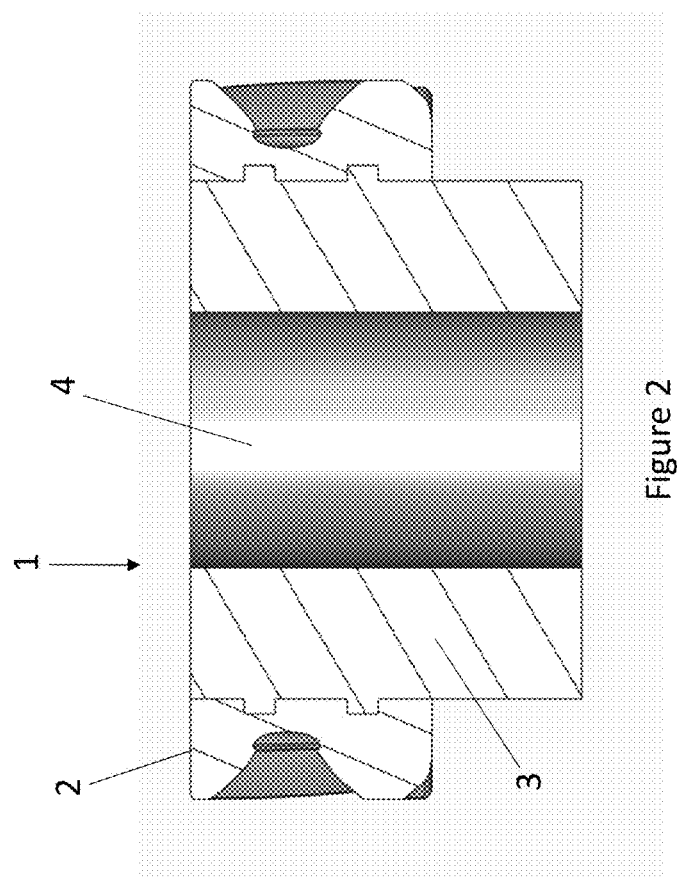
FIG. 2 is a cross sectional view of a gear made in accordance with this.
Figure 1:
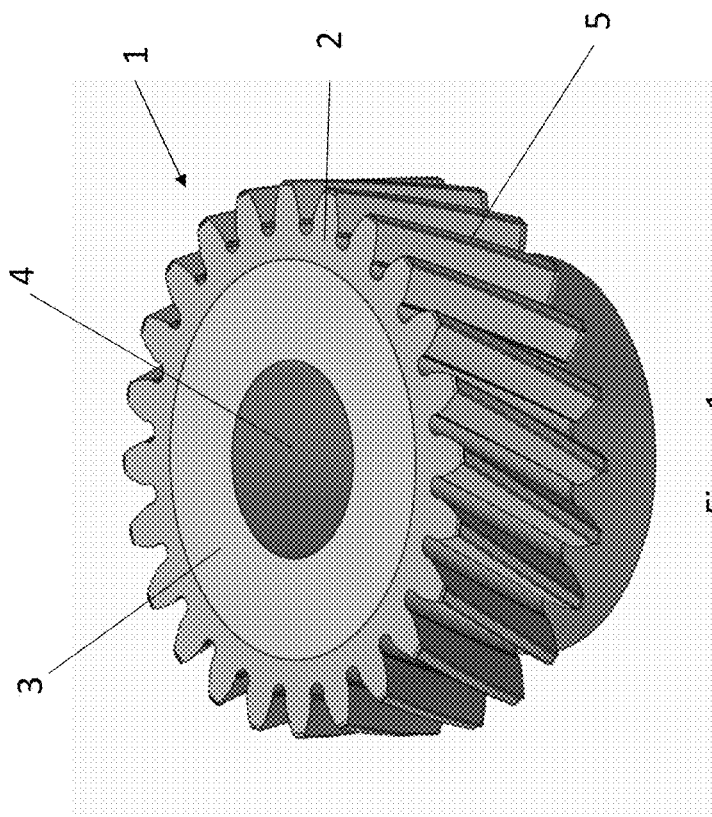
FIG. 1 illustrates a gear made in accordance with this invention having an outer component and an inner component.
Figure 3:
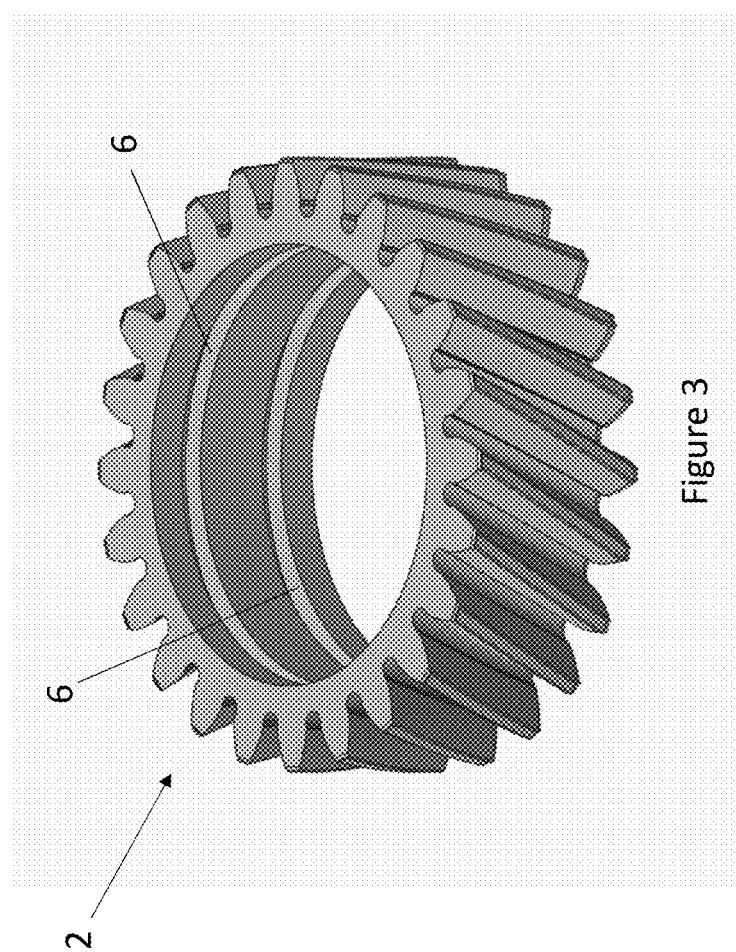
FIG. 3 illustrates the outer component ring which can be employed in manufacturing a gear in accordance with this invention. The outer component ring illustrated in FIG. 3 includes groves on its inner surface to facilitate bonding with an inner component of the gear.

It should be understood that various aspects of the invention are presented in FIGS. 1-3 which may not be drawn to scale and which is not intended to be limiting with respect to the scope of the invention now being claimed. In most cases like components which are illustrated in the drawings are numbered using like reference numerals.

DETAILED DESCRIPTION OF THE INVENTION

The present invention will now be described in terms of the method which it employs in manufacturing high strength, durable toroidal parts, such a gears, bearing races, and one-way clutches. It should be understood that FIGS. 1-3 and the descriptions of the present invention provided herein have been simplified to illustrate elements that are relevant for a clear understanding of the present invention, while eliminating, for purposes of clarity, other elements and/or descriptions that are well-known to those skilled in the art. Those of ordinary skill in the art will recognize that other elements may be desirable in order to implement the present invention. However, because such elements are well known in the art, and because they do not facilitate a better understanding of the present invention, a discussion of such elements is not provided herein.

The toroidal parts of this invention are comprised of an external component (an external layer) and an internal component (an internal layer). FIG. 1 is an illustration of a gear 1 which was manufactured in accordance with this invention. As can be seen this gear includes such an external component 2 and an internal component 3. As can be seen, the external component 2 includes an external gear face 5 which is situated on the outer radial surface of the gear 1. The external component 2 is comprised of forged powder metal or a wrought metal and is manufactured utilizing conventional techniques. The internal component 3 of the gear 1 is comprised of a powder metal which has been formed within the confines of the external component 2 under pressure and sintered. During sintering the internal component 3 expands and by virtue of compressive forces against the external component 2 is thereby provided with high strength. This results in an increase in strength of at least 2.5 times in torsion due to compressive load. In any case, the internal component 3 can be molded so as to have an internal profile of any desired shape, such as a gear face or a hexagon shaped hole, or in the case of the gear illustrated in FIG. 1 a circular shaped hole 4.

In the first step of the process of this invention the outer component of the toroidal part is manufactured employing conventional equipment and techniques. In one scenario the outer component is made with forged powder metal and in another scenario the outer component of the part is made with a wrought metal. In one embodiment of this invention groves can be included on inner surface of the outer component to facilitate strong bonding between the inner component and the outer component of the toroidal part. Such groves 6 are shown on the outer component a gear as illustrated in FIG. 3.

The inner component of the part is molded in the outer component by placing a metal powder composition into a mold with the outer component of the part defining the outer periphery of the inner component. The powder metal is then compacted in the mold under a high pressure which is typically within the range of 20 tsi to 70 tsi (tons per square inch). This results in the formation of an uncured or green inner component of the part which is contained radially within the outer component of the part. The part having the green inner component is then cured or sintered by heating the entire part in a sintering furnace, such as an electric or gas-fired belt or batch sintering furnace, for a predetermined time at high temperature in an inert environment. Nitrogen, vacuum and Nobel gases, such as helium or argon, are examples of such inert protective environments. Metal powders can be sintered in the solid state with bonding by diffusion rather than melting and re-solidification. The powder metal composition used in making inner component of the part will be selected so that it will expand during sintering to a greater degree than does the outer component. This is typically done by using a powder metal composition which contains at least about 1 weight percent copper.

The metal powders that can be utilized in manufacturing high strength toroidal parts of this invention are typically a substantially homogenous powder including a single alloyed or unalloyed metal powder or a blend of one or more such powders and, optionally, other metallurgical and non-metallurgical additives such as, for example, lubricants. Thus, "metallurgical powder" may refer to a single powder or to a powder blend. There are three common types of powders used to make powder metal mixes and parts. The most common are homogeneous elemental powders such as iron, copper, nickel and molybdenum. These are blended together, along with the copper and other additives as desired to attain needed results, such as lubricants and graphite, and molded as a mixture. A second possibility is to use various alloyed powders, such as an iron-nickel-molybdenum-copper steel or iron-chromium-molybdenum-copper steel. In this case, the alloy is formed in the melt prior to atomization and each powder particle is a small ingot having the same composition as the melt. Again, additives of graphite, lubricant and elemental powders may be added to make the mix. A third type is known as "diffusion bonded" powders. In this case, an elemental powder, such as iron, is mixed with a second elemental powder, including copper, and is subsequently sintered at low temperatures so partial diffusion of the powders occurs. This yields a powder with fairly good compressibility which shows little tendency to separate during processing. While iron is the most common metal powder, powders of other metals such as aluminum, copper, tungsten, molybdenum and the like may also be used as long metal composition expands during sintering to a greater degree than does the metal utilized in the outer component of the part. Also, as used herein, an "iron metal powder" is a powder in which the total weight of iron and iron alloy powder is at least 50 percent of the powder's total weight. While more than 50% of the part's composition is iron, the powder may include other elements such as carbon, sulfur, phosphorus, manganese, molybdenum, nickel, silicon, chromium, and, of course, copper.

At least four types of metallic iron powders are available. Electrolytic iron, sponge iron, carbonyl iron and nanoparticle sized iron are made by a number of processes. Electrolytic iron is made via the electrolysis of iron oxide, and is available in annealed and unannealed form from, for example, OM Group, Inc., which is now owned by North American Höganäs, Inc. Sponge iron is also available from North American Höganäs, Inc. There are at least two types of sponge iron: hydrogen-reduced sponge iron and carbon monoxide-reduced sponge iron. Carbonyl iron powder is commercially available from Reade Advanced Materials. It is manufactured using a carbonyl decomposition process.

Depending upon the type of iron selected, the particles may vary widely in purity, surface area, and particle shape. The following non-limiting examples of typical characteristics are included herein to exemplify the variation that may be encountered. Electrolytic iron is known for its high purity and high surface area. The particles are dendritic. Carbonyl iron particles are substantially uniform spheres, and may have a purity of up to about 99.5 percent. Carbon monoxide-reduced sponge iron typically has a surface area of about 95 square meters per kilogram ($m^2/kg$), while hydrogen-reduced sponge iron typically has a surface area of about 200 $m^2/kg$. Sponge iron may contain small amounts of other elements, for example, carbon, sulfur, phosphorus, silicon, magnesium, aluminum, titanium, vanadium, manganese, calcium, zinc, nickel, cobalt, chromium, and copper. Additional additives may also be used in molding the preform for the inner component of the toroidal part being manufactured.

The powder metal preform is then sintered. After being removed from the preform die, the toroidal part is typically placed in a sintering furnace where it is sintered at a temperature which is about 60% to about 90% of the melting point of the metal composition being employed. The sintering temperature will normally be in the range of 1500° F. (816° C.) to 2450° F. (1343° C.). The sintering temperature for the iron based compacts normally utilized in the practice of this invention will more typically be within the range of 2000° F. (1093° C.) to about 2400° F. (1316° C.). The sintering temperature utilized will typically be decreased with increasing levels of copper due to the considerably lower melting point of the copper. In any case, the appropriate sintering temperature and time-at-temperature will depend on several factors, including the chemistry of the metallurgical powder, the size and geometry of the compact, and the heating equipment used. Those of ordinary skill in the art may readily determine appropriate parameters for the molding steps to provide a green preform of suitable density and geometry which is then placed into a furnace at 2000° F. to 2450° F. for approximately 30 minutes in a protective atmosphere to sinter the metal.

The sintering temperature is typically within the range of 2000° F. to 2400° F. and may be, for example, 2070° F. for many iron-based preforms. Depending on, for example, the type of powder metal and the desired article, the sintering temperature can vary. After being sintered in the furnace the toroidal part is normally cooled to room temperature.

EXAMPLE 1

In this experiment a gear of the size and shape illustrated in FIG. 2 was manufactured utilizing the method of this invention. The gear was then subjected to a push-out test for strength on a Tinius-Olsen test machine. In the procedure used an attempt to push the internally molded inner component of the gear out of the outer component of the gear (to push the internally molded P/M material through the P/F helical ring) was made by applying a maximum load capacity of 20 tons (the maximum capacity of the equipment). The inner component of the gear remained firmly attached with no evidence of damage to the part up to the maximum capacity of the Tinius-Olsen machine. Accordingly, the inner component of the gear was firmly attached and could not be pushed through the outer component in this testing which showed that the inner component was firmly attached to the outer component of the gear.

The gear was also subjected to a torsion test wherein the shaft of a 0.75 inch hex wrench was inserted through hexagon shaped hole in the middle of the gear. The gear was clamped into place with a series of pointed set-screws which were positioned between the teeth of the gear. Then, torque was applied to the hex wrench with torque being increased until the hex wrench broke at a torque of 1150 ft-lbf. This torsion testing again showed that the gear made in accordance with this invention offered excellent strength in torsion.

The gear was also cut and analyzed by microscopy which showed that there was metal to metal bonding between the metal of the inner component and the metal of the outer component. Again, the analysis showed that the part was of excellent quality.

While certain representative embodiments and details have been shown for the purpose of illustrating the subject invention, it will be apparent to those skilled in this art that various changes and modifications can be made therein without departing from the scope of the subject invention.

What is claimed is:

1. A method of manufacturing a high strength part which comprises (1) providing an external component having an external profile and an internal profile, wherein the external component is comprised of a forged powder metal or a wrought metal; (2) compacting a powder metal composition within the internal profile of the external component to produce a green internal component, wherein the powder metal composition consists of iron, copper, molybdenum, optionally nickel, optionally chromium, optionally carbon, optionally sulfur, optionally phosphorus, optionally silicon, optionally magnesium, optionally aluminum, optionally titanium, optionally vanadium, optionally manganese, optionally calcium, optionally cobalt, optionally graphite, and optionally a lubricant; and (3) sintering the green internal component within the confines of the external component to produce high strength part, wherein the internal component is comprised of a powder metal which expands to a greater degree than does the forged powder metal or the wrought metal during sintering, and wherein the internal profile of the external component includes grooves, and wherein the groves facilitate bonding between the internal component and the external component.

2. The method as specified in claim 1 wherein the powder metal which is compacted in step (2) to produce the green internal component includes from 1 weight percent to about 5 weight percent copper.

3. The method as specified in claim 1 wherein the powder metal which is compacted in step (2) to produce the green internal component includes from 0.1 weight percent to 1.5 weight percent molybdenum.

4. The method as specified in claim 1 wherein the powder metal which is compacted in step (2) to produce the green internal component includes from 0.1 weight percent to 4 weight percent nickel.

5. The method as specified in claim 1 wherein the powder metal which is compacted in step (2) to produce the green internal component includes from 0.2 weight percent to 3 weight percent nickel.

6. The method as specified in claim 1 wherein the powder metal which is compacted in step (2) to produce the green internal component includes from 1 weight percent to 3 weight percent copper.

7. The method as specified in claim 1 wherein the powder metal which is compacted in step (2) to produce the green internal component includes from 0.1 weight percent to 2 weight percent graphite.

8. The method as specified in claim 1 wherein the powder metal which is compacted in step (2) to produce the green internal component consists of 1 weight percent to 3 weight percent copper and 97 weight percent to 99 weight percent iron.

9. The method as specified in claim 1 wherein the external profile of the external component is a gear face.

10. The method as specified in claim 1 wherein the external component is comprised of a wrought metal.

11. The method as specified in claim 1 wherein the external component is comprised of a forged sintered powder metal.

12. The method as specified in claim 1 wherein the powder metal composition is compacted within the internal profile of the external component utilizing a pressure which is within the range of 20 tons per square inch to 70 tons per square inch.

13. The method as specified in claim 1 wherein the green internal component is sintered at a temperature which is within the range of 1500° F. to 2450° F.

14. The method as specified in claim 1 wherein the green internal component is sintered at a temperature which is within the range of 2000° F. to 2400° F.

15. The method as specified in claim 1 wherein the green internal component is sintered in an inert environment which is a vacuum, a nitrogen atmosphere, or a noble gas atmosphere.

16. The method as specified in claim 1 wherein the green internal component is sintered in an inert environment.

\* \* \* \* \*